Figure 1:
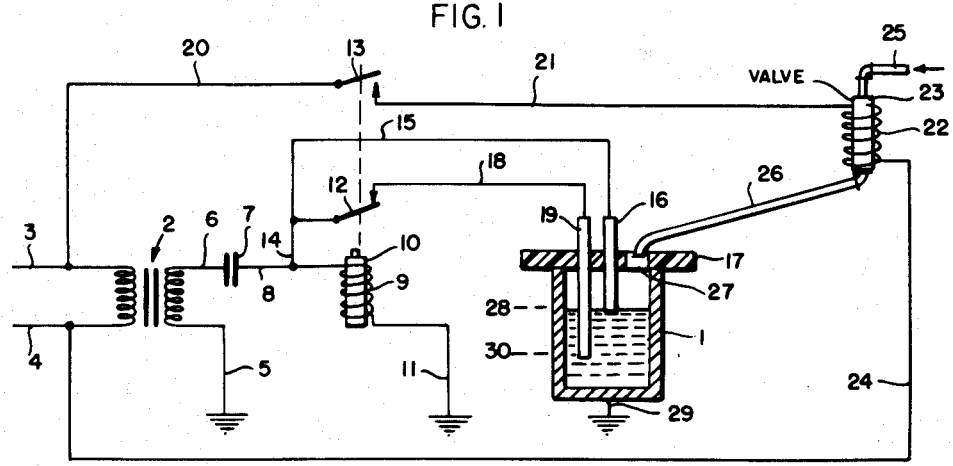

Feb. 23, 1965  R. J. MUELLER  3,170,479
LIQUID LEVEL CONTROL APPARATUS
Original Filed March 27, 1959

INVENTOR:
RICHARD J. MUELLER
BY Marshall, Johnston,
Cook & Root
ATT'YS

United States Patent Office

3,170,479
Patented Feb. 23, 1965

3,170,479
LIQUID LEVEL CONTROL APPARATUS
Richard J. Mueller, Franklin Park, Ill., assignor to Automatic Canteen Company of America, Chicago, Ill., a corporation of Delaware
Continuation of application Ser. No. 802,365, Mar. 27, 1959. This application Jan. 17, 1962, Ser. No. 168,574
5 Claims. (Cl. 137—392)

This invention is a continuation of my copending application, Serial Number 802,365, filed on March 27, 1959, now abandoned, and relates to control apparatus and, more specifically, to apparatus which is particularly well adapted for automatically controlling the liquid level in coin operated beverage vending machines, and the like.

It is a primary object of the present invention to provide novel control apparatus which is operable in a novel and expeditious manner to automatically control the liquid level in tanks, or the like.

Another object is to afford novel control apparatus which is operable in a novel and expeditious manner to automatically feed a suitable charge of liquid into a tank, or the like, when the liquid level in the tank falls below a predetermined level.

Another object is to insure, in a novel manner, that not more than the desired charge of liquid is discharged into such a tank.

A further object is to provide novel electrically operated control apparatus which is operable to continually sense the liquid level in a tank, or the like, in a novel and expeditious manner.

Another object is to provide novel control apparatus of the aforementioned type which is continually operable but which at most times in normal operation draws little power and a minimum current.

Yet another object of the present invention is to provide novel control apparatus of the aforementioned type which embodies parts affording a resonant circuit and sensing devices constituted and arranged in a novel and expeditious manner so as to afford an effective control for operation of a valve.

A further object of the present invention is to afford novel electrically operable control apparatus of the aforementioned type which is practical, reliable, efficient and economical in operation; is compact in size; may be quickly and easily serviced and maintained; and may be readily and economically produced commercially.

Another object is to afford novel electrically operated control apparatus of the aforementioned type which may be readily installed in a relatively limited space in coin operated beverage vending machines such as, for example, coffee vending machines, and the like, to afford a novel and practical liquid control therefor.

Another object of the present invention is to afford a novel electrically operated control apparatus of the aforementioned type wherein, if the electric power from the electric power supply source is interrupted, or is interrupted and then reestablished, the machine automatically resumes normal operation when the power is reestablished and an undesired cycle of operation such as, for example, the feeding of an undesired charge of liquid is not effected.

Other and further objects of the present invention will be apparent from the following description and claims and are illustrated in the accompanying drawings which, by way of illustration, show the preferred embodiments of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 2:
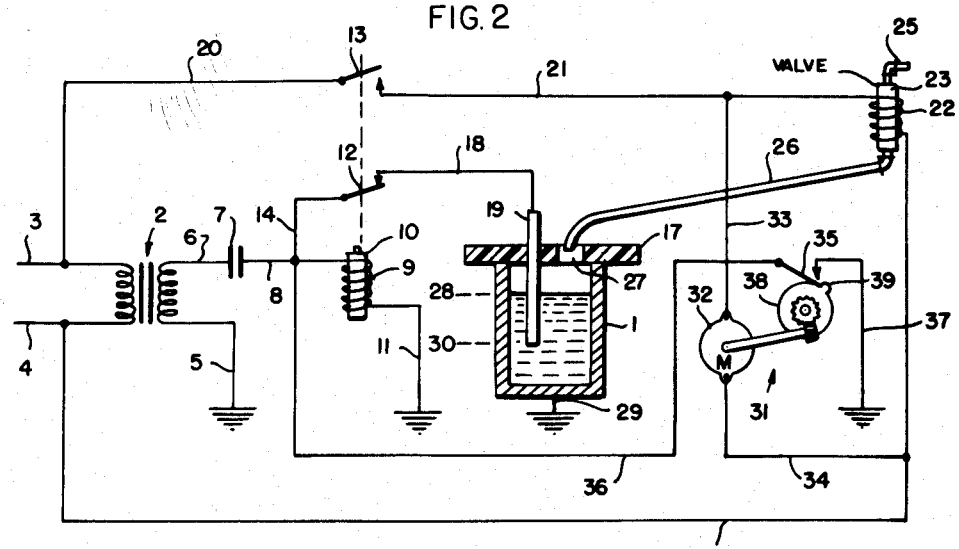

In the drawings:

FIG. 1 is a partially schematic and partially sectional view of control apparatus embodying the principles of my invention; and FIG. 2 is a view similar to FIG. 1, but showing a modified form of my invention.

In FIG. 1, control apparatus, embodying the principles of my invention, is shown to illustrate the preferred embodiment of my invention.

The control apparatus is shown in FIG. 1 in position to control the level of liquid in a suitable container 1, such as, for example, the beverage storage tank in a suitable coffee vending machine, or the like. The control apparatus includes an isolation transformer 2 having its primary connected to a suitable source of electrical power such as, for example, power lines 3 and 4 of a suitable power source such as, for example, a 110 volt, 60 cycle power source. One side of the secondary of the transformer 2 is connected by a suitable conductor 5 to ground, and the other side of the secondary of the transformer 2 is connected by a suitable conductor 6 to one side of a capacitor 7. The other side of the capacitor 7 is connected by a suitable conductor 8 to one side of the coil 9 of a relay 10, and the other side of the coil 9 is connected by a suitable conductor 11 to ground.

A normally closed switch 12 and a normally open switch 13 are so associated with the relay 10 that when the coil 9 is deenergized or is not excited with full exciting current, the switch 12 is closed and the switch 13 is open, and when the coil 9 is energized with full exciting current, the relay 10 is effective to open the switch 12 and close the switch 13 and to hold the same in these latter respective positions. The switches 12 and 13 may be spring biased or otherwise urged toward their normal positions; viz., switch 12 closed and switch 13 opened.

One side of the switch 12 is connected by a suitable conductor 14 to the conductor 8. The conductor 14 is also connected by a suitable conductor 15 to the upper end of an electrode 16 mounted in a suitable supporting member such as the cover member 17 mounted on the open upper end of the tank 1. The supporting member 17 may be made of any suitable dielectric material such as, for example, rubber, or the like, to thereby afford an electrically insulated support for the electrode 16 on the tank 1.

The side of the switch 12 opposite to the side connected to the conductor 14 is connected by a suitable conductor 18 to another elongated electrode 19 supported by the cover member 17 in electrically insulated relation to the tank 1. Both of the electrodes 16 and 19 are so supported by the cover member 17 that they extend downwardly into the tank 1 in spaced relation to each other, and in spaced relation to the walls of the tank 1. As may be seen in FIG. 1, the electrode 19 extends downwardly into the tank 1 a considerably greater distance than does the electrode 16, for a purpose which will be discussed in greater detail presently.

One side of the normally open switch 13 is connected by a suitable conductor 20 to the power line 3, and the other side of the switch 13 is connected by a suitable conductor 21 to one side of the coil 22 of an electrically operated valve 23. The other side of the coil 22 is connected by a suitable conductor 24 to the other power line 4, so that when the switch 13 is closed, the coil 22 is energized to thereby open the valve 23. The valve 23 may be any one of a number of suitable electrically operated valves readily available on the market and is disposed between an inlet conduit 25 and an outlet conduit 26 for controlling that flow of liquid from the conduit 25 to the conduit 26. The conduit 25 may be connected to a suitable source of liquid, not shown, which it is desired to feed into the tank 1 in controlled amounts in the operation of my novel apparatus. The conduit 26 extends from the valve 23 into position whereby when liquid flows from the valve 23 through the conduit 26 it is discharged thereby through an opening 27 in the cover 17 into the tank 1.

In the normal operation of the control apparatus shown in FIG. 1, the tank 1 is initially filled with the liquid to be dispensed therefrom such as, for example, the aforementioned coffee, to a level 28 wherein the lower end of the electrode 16 is just in contact with the upper surface of the liquid in the tank 1. It will be seen that under such conditions, and with the switch 12 closed, two parallel shunt circuits are afford around the coil 9. One of the shunt circuits extends from the conductor 8 through the conductor 14, the switch 12, the conductor 18, the electrode 19, the liquid in the container 1, and a conductor 29, which may include the container 1, to ground. The other shut circuit extends from the conductor 8 through the conductors 14 and 15, the electrode 16, the liquid in the container 1, and the conductor 29 to ground.

The impedance of the capacitor 7 and the coil 9 are substantially the same at the frequency of electric power source to which they are to be connected, and are so selected that the series circuit which I have afforded across the secondary of the transformer 2, and which includes the capacitor 7 and the coil 9, is a resonant circuit when the aforementioned shunt circuits through the electrodes 16 and 19, respectively, are open. Thus, for example, I have found that when my novel control apparatus is used in a coffee beverage vending machine wherein the liquid in the tank 1 is coffee, and wherein the transformer is such as to afford a secondary voltage of 135 volts at 60 cycles, a suitable resonant circuit may be afforded with the capacitor 7 being one-half microfarad condenser and the coil 9 being a two thousand ohm resistance coil.

When the series circuit through the capacitor 7 and the coil 9 is a resonant circuit, the current flow through the coil 9 is sufficient to fully excite the latter. However, the impedance of each of the shunt circuits through the electrodes 16 and 19, respectively, when each respective circuit is closed, is substantially less than the impedance of the coil 9 so that, when either of the aforementioned shunt circuits is closed the coil 9 is shorted out so that the series circuit through the capacitor 7 and the coil 9 is out of resonance and the current flow through the coil 9 is insufficient to fully excite the coil 9 and, therefore, the relay 10 is ineffective to either open or close the switches 12 and 13, respectively, or to hold them opened or closed, respectively.

Thus, when the tank 1 is filled to the normal initial level, wherein the liquid is in contact with both of the electrodes 16 and 19, the coil 9 is shorted out through both of the aforementioned shunt circuits. This is true because, with the liquid in the tank 1 in contact with the electrode 16 the coil 9 is shorted out so that the current flow therethrough is less than necessary to excite the coil 9 sufficiently to open the switch 12 or to hold it open and, therefore, the latter is closed so that the shunt circuit through the electrode 19 is also closed.

As liquid is withdrawn from the tank 1, the level thereof falls below the level 28 and, therefore, the liquid moves out of contact with the electrode 16 while still remaining in contact with the electrode 19. Hence, while the one shunt circuit is still maintained from the capacitor 7 through the switch 12 and the electrode 19 to ground, the other shunt circuit from the capacitor 7 through the electrode 16 is broken.

As the removal of liquid from the tank 1 continues, the liquid level in the tank 1 continues to drop toward the level 30, at which it is just in contact with the electrode 19. During this drop, the coil 9 remains shorted through the electrode 19 and, therefore, the relay 10 remains ineffective to close the switch 13 or to open the switch 12.

When sufficient liquid has been withdrawn from the tank 1 that the liquid falls below the level 30 so that the liquid is no longer in contact with the electrode 19, the short circuit of the coil 9 is completely broken, and sufficient current then flows through the coil 9 to fully excite the latter and thereby cause energization of the relay 10 effective to open the switch 12 and close the switch 13.

The closing of the switch 13 is effective to energize the coil 22 of the valve 23 to thereby cause the valve 23 to be opened and feed liquid from the conduit 25 through the conduit 26 into the tank 1. As the liquid again rises in the tank 1 it first reaches the level 30 where it again contacts the lower end of the electrode 19. However, it will be remembered that the switch 12 has been opened by energization of the relay 10 and, therefore, the circuit between the electrode 19 and the capacitor 7 is broken. Hence, the relay 10 is maintained in energized condition by the current flow through the coil 9.

As the liquid thereafter continues to rise in the tank 1, it eventually again reaches the level 28 wherein it is in contact with the lower end portion of the electrode 16. This again affords a short circuit for the coil 9, the circuit extending from the secondary of the transformer 2 hrough the capacitor 7, the conductors 8, 14 and 15, the electrode 16, the liquid in the tank 1, the conductor 29, and ground back to the secondary of the transformer 2. Upon this deenergization of the relay 10, the switch 13 again opens to thereby deenergize the coil 22 and close the valve 23, and shut off the flow of liquid from the supply conduit 25 through the conduit 26 into the tank 1. The deenergization of the relay 10 is also effective to permit the switch 12 to again close and whereby reestablish the circuit from the secondary of the transformer 2 through the electrode 19 and back through ground to the secondary of the transformer 2. When this occurs, the control apparatus is ready for another complete cycle of operation.

It will be seen that with my novel control apparatus as shown in FIG. 1, the only current flow therethrough is normally that through the transformer 2, the switch 13 being normally open so that most of the time no current flows through the circuit which includes the switch 13 and the coil 22. When the circuit through the capacitor 7 and the coil 9 is out of resonance, very little current flow through the transformer occurs, all the circuits across the secondary of the transformer at such time being in series with the capacitor 7 and out of resonance. The only time that substantial current flow occurs through the control apparatus is during a refilling operation, when the switch 13 is closed and the circuit through the capacitor 7 and the coil 9 is in resonance. Hence, it will be seen that my control apparatus is capable of continuous automatic functioning with relatively little power being drawn.

In FIG. 2, a modified form of my novel control apparatus illustrated in FIG. 1 is shown, and the parts of the apparatus shown in FIG. 2 which are the same as parts of the apparatus shown in FIG. 1, are indicated by the same reference numerals.

Hence, it will be seen that in the apparatus shown in FIG. 2, the primary of the transformer 2 is connected to power lines 3 and 4; the secondary of the transformer 2 is connected by a conductor 6, a capacitor 7, and conductors 8 and 14, to one side of a normally closed switch 12; and the other side of the switch 12 is connected by a conductor 18 to an electrode 19 mounted on the tank 1 in electrically insulated relation thereto by means of a suitable supporting member 17. The liquid in the tank 1 is connected by a conductor 29 to ground, and the secondary of the transformer 2 is also connected to a conductor 5 to ground.

In the apparatus shown in FIG. 2, a normally open switch 13 is connected at one side by a conductor 20 to the power line 3, and is connected at the other side through a conductor 21, the coil 22 of an electrically operated valve 23, and a conductor 24 to the power line 4. The valve 23 is the apparatus shown in FIG. 2, like the valve 23 shown in FIG. 1, is connected to a suitable supply conduit 25 and a discharge conduit 26 and is effective, when open, to feed liquid from the conduit 25 through the conduit 26 into the opening 27 in the cover member 17.

The control apparatus shown in FIG. 2 also includes the relay 10 effective to control the opening and closing of the switches 12 and 13 as previously described, the coil 9 of the relay 10 being connected at one side to the conductor 8 and at the other side by a conductor 11 to ground as in the control apparatus shown in FIG. 1.

The primary difference between the control apparatus shown in FIG. 1 and that shown in FIG. 2 is that the apparatus shown in FIG. 2 does not embody the shunt circuit which includes the electrode 16, and some parts embodied in the apparatus shown in FIG. 2 are not embodied in the apparatus shown in FIG. 1. These additional parts embodied in the apparatus shown in FIG. 2 include a synchronous timer 31 for limiting the quantity of liquid fed into the tank 1 in any one refilling cycle. The timer 31 embodies a motor 32 which is connected in parallel to the coil 22 of the valve 23 between the conductors 21 and 24, a conductor 33 connecting one side of the motor 32 to the conductor 21, and a conductor 34 connecting the other side of the motor 32 to the conductor 24.

Also, one side of a normally open switch 35 is connected by a conductor 36 to the conductor 8, and the other side of the switch 35 is connected by a suitable conductor 37 to ground. The motor 32 is drivingly connected to a suitable cam 38 which is effective at the close of each rotation of the latter to momentarily close the normally open switch 35.

In the operation of the control apparatus shown in FIG. 2, the tank 1 is also normally initially filled to the level 28. This means that the electrode 19 is disposed in the liquid and, therefore, the coil 9 of the relay 10 is short circuited by the circuit which includes the normally closed switch 12 and the electrode 19. As liquid is withdrawn from the tank 1, this short-circuited condition of the coil 9 prevails until eventually the liquid in the tank 1 drops below the level 30 and, therefore, out of contact with the electrode 19. When this occurs, the short circuit around the relay 10 is broken to thereby cause the relay 10 to be energized in the manner previously described with respect to the apparatus shown in FIG. 1 and thereby cause the switch 12 to be opened and the switch 13 to be closed.

Closure of the switch 13 in the apparatus shown in FIG. 2 is effective to open the valve 23 as previously described so that liquid flows from the inlet conduit 25 through the discharge conduit 26 into the tank 1. The closure of the switch 13 in the apparatus shown in FIG. 2 is also effective to close the circuit from the power line 3 through the conductor 20, the switch 13, the conductors 21 and 33, the motor 32, the conductor 34, and the conductor 24, to the power line 4 and thereby energize the motor 32. Operation of the motor 32 is effective to rotate the cam 38 in a clockwise direction as viewed in FIG. 2 from its initial position as shown in FIG. 2. Toward the close of a complete rotation of the cam 38, the lobe 39 thereon moves into engagement with the switch 35 and momentarily closes the same. When this occurs, it will be seen that a short circuit around the relay 10 is again established from the conductor 8 through the conductor 36, the switch 35, and the conductor 37 back through ground to the open side of the secondary of the transformer 2. This, it will be seen, is effective to deenergize the relay 10 to again cause the switch 13 to open and thereby close the valve 23 and shut off the flow of liquid through the conduit 26 into the tank. The opening of the switch 13 is also effective to deenergize the motor 32, the overrun of the motor 32 being sufficient to carry the cam 38 past switch-closing relation to switch 35 and back to initial starting position.

The deenergization of the relay 10, caused by the aforementioned closing of the switch 35, is also effective to cause the switch 12 to close. If the amount of liquid fed into the tank 1 during the preceding liquid-feeding cycle has been insufficient to raise the liquid in the tank to a level wherein it is again in contact with the electrode 19, the short circuit through the electrode 19 remains broken. Therefore, under such circumstances, as soon as the switch 35 is permitted to open by the passage of the cam lobe 39 out of switch-closing engagement therewith, the coil 9 is immediately energized to initiate another complete liquid-feeding cycle of operation. However, if at the end of a liquid-feeding cycle of operation the liquid in the tank is again in contact with the electrode 19, the closing of the switch 12, caused by the momentary shorting out of the coil 9 through the switch 35 at the close of the cycle of operation, is effective to reestablish the shunt circuit from the conductor 8 through the electrode 19 and the liquid in the tank 1 back through ground to the other side of the secondary of the transformer 2 and thereby short out the coil 9 of the relay 10 until sufficient liquid has again been withdrawn from the tank 1 to uncover the electrode 19.

It will be seen that with the apparatus shown in FIG. 2, only a predetermined amount of liquid is fed into the tank 1 during a cycle of operation of the synchronous timer 31. This is true even though during the refilling operation additional liquid should be withdrawn from the tank 1, the lobe 39 on the cam 38 causing the switch 35 to be closed after one cycle of operation to thereby again deenergize the relay 10. Hence, it will be seen that this is one basic difference between the control apparatus shown in FIG. 2 and that shown in FIG. 1, the control apparatus shown in FIG. 1 being effective to continuously feed liquid into the tank 1 until the liquid again reaches its initial level 28, where it again contacts the lower end of the electrode 16. However, both forms of my novel apparatus are effective to automatically and effectively keep a tank or other suitable container filled with liquid to a desired level, even though liquid may be withdrawn from the tank during the refilling operation, it being understood, of course, that under such conditions the feeding of liquid into the tank during a refilling operation is greater than any withdrawal of liquid from the tank during the refilling operation.

It will be seen that when using either of the forms of my novel control apparatus shown herein to control the liquid level in a suitable container such as, for example, the tank 1, there is no danger that an input power failure to the control apparatus will cause an undesired opening of the valve 23 with a consequent undesired feeding of a charge, or a partial charge of liquid into the tank 1. Thus, it will be seen that in my novel control apparatus the switch 12 is normally closed and a power failure to the relay 10 does not effect any actuation of the valve 23 or of the synchronous timer 31, and that even after such an interruption, the reestablishment of power to the control apparatus does not effect any such undesired operation of the valve 23 or the timer 31, the circuit through the switch 12 remaining effective to short circuit the relay 10.

This, it will be seen, is important when the control apparatus is to be used in devices or machines wherein it is desirable that flooding or the surreptitious withdrawal of liquid is to be prevented. Thus, for example, it will be seen that if the level of the liquid in the tank 1 was at such a height that an additional charge of liquid into the tank 1 would cause an overflow therefrom, flooding of the device or apparatus could result from a power failure to the transformer 2 if the apparatus were so constructed that interruption or reestablishment of energization from the power source were effective to cause an additional feeding of liquid into the tank. Also, in machines such as certain types of beverage vending machines wherein filling of the supply tank to a level above a predetermined level is effective to discharge beverage from the usual discharge nozzle, surreptitious removal of such beverage could be effected by unplugging the machine from its power source and again plugging it into the power source if such actions were effective to cause a liquid-feeding cycle of operation whereby liquid was fed into the supply tank. My novel apparatus protects against such accidental flooding, or surreptitious withdrawal of liquid or beverage, from such a tank.

From the foregoing it will be seen that I have afforded a novel and practical control apparatus which is effective, efficient and reliable in controlling the liquid level in a container such as a tank, or the like.

Also, it will be seen that I have afforded a novel control apparatus which may be incorporated in compact form in relatively small spaces.

In addition, it will be seen that I have afforded a novel and practical control apparatus which may be readily and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a fluid control apparatus of the type comprising a fluid containing container, valve means operable to feed fluid into said container, and means for sensing the fluid level within said container including at least one electrode adapted to normally be in contact with a portion of the fluid contained within said container, the improvement therein comprising, in combination, a confined quantity of electrically conductive fluid, first switch means for controlling the operation of said valve means, a transformer, a capacitor connected to one side of the secondary of said transformer, a relay including a coil, first circuit means including said coil connecting said capacitor in series back through ground to the other side of said secondary, other circuit means connected to said first circuit means between said coil and said capacitor for short circuiting said relay, said other circuit means including a normally closed switch and said confined fluid, said relay being operative to close said first switch and open said second switch when the fluid present reaches a level sufficient to interrupt the current in said other circuit means, said relay being rendered inoperative to hold said first switch closed and said second switch open when the fluid level being sensed reaches a level sufficient to restore said other circuit to current carrying capacity.

2. In a fluid control apparatus of the type comprising a fluid containing container, valve means operable to replenish fluid confined in said container, and means for sensing the level of the confined fluid, the level-responsive means comprising in combination, normally open electrical circuit means connected to said valve means for controlling operation of the latter, a relay normally energized below full exciting current, said relay being operable when energized with full exciting current to close said normally open circuit means, a transformer, a capacitor having substantially the same impedance as said relay, second circuit means including said capacitor and relay connected in series across the secondary of said transformer with one side of said capacitor connected to one side of said secondary and one side of said relay connected through ground to the other side of said secondary, third circuit means including a normally closed switch adapted to be in series with at least a portion of said sensing means and operable to connect said second circuit means to ground from between said capacitor and said relay, said relay being operable when energized with full exciting current to open said normally closed switch, said capacitor and said relay having impedances of such a nature that when said third circuit means is open, said second circuit means affords a series resonant circuit effective to energize said relay with full exciting current, and when said third circuit means is closed, said second circuit means is out of resonance and is ineffective to energize said relay with full exciting current.

3. Control apparatus for monitoring and restoring the liquid level in a container which comprises electrical connection means adapted to be connected to a fluctuating potential electric power source, an isolation transformer having its primary connected across said connection means, series resonant circuit means, including a capacitor and electromagnetic means, connected across the secondary of said transformer with one end of said circuit means connected directly to one side of said secondary, with said capacitor connected between said side and said electromagnetic means, and the other end of said circuit means connected through ground to the other side of said secondary, said capacitor and electromagnetic means having substantially the same impedance, two electrodes, means for supporting said electrodes in electrically insulated relation to each other with one of said electrodes extending downwardly farther than the other of said electrodes, second series circuit means of lesser electrical impedance than said electromagnetic means and including a normally closed switch and said one electrode, said second circuit means being connected in series with said capacitor across said secondary from between said capacitor and said electromagnetic means when said switch is closed and the liquid present is at a level above the bottom of said one electrode, with one side of said second circuit means connected directly to said series resonant circuit means and the other side of said second circuit means, including said liquid, connected through ground to said other side of said secondary, third series circuit means of lesser electrical impedance than said electromagnetic means including said other electrode, said third circuit means being connected in series with said capacitor across said secondary from between said capacitor and said electromagnetic means when said liquid in said container is at a level above the bottom of said other electrode, with one side of said third circuit means connected directly to said series resonant circuit means and the other side of said third circuit means, including said liquid, connected through ground to said other side of said secondary, means, including a valve, for selectively replenishing the confined liquid, and fourth circuit means, including a normally open switch, connected to said connection means and operable upon closing of said normally open switch to effect opening of said valve to replenish said liquid, said fourth circuit means being operable upon opening of said normally open switch to effect closing of said valve and thereby terminate feeding of liquid, said electromagnetic means being operative to open said normally closed switch and close said normally open switch when said second and third circuit means are open and being ineffective to open said normally closed switch or to close said normally open switch when either said second or third circuit means are closed.

4. A fluid level control apparatus, adapted for use with a container of electrical conducting fluid, comprising: valve means operable to feed fluid into said container, and means for sensing the fluid level within the container; said sensing means including first switch means for controlling the operation of said valve means, second switch means for controlling the activation of at least one portion of said sensing means, fluid level responsive means for closing said first switch means and opening said second switch means in response to a predetermined fluid level in the container to thereby operate said valve means to add fluid to said container and to deactivate said one portion of said sensing means, and means for shunting out said level responsive means through the fluid in the container when a predetermined fluid level has been attained to thereby open said first switch means and render said valve means inoperative and to close said second switch means for reactivating said one portion of said sensing means.

5. A fluid level control apparatus for use with a container of electrically conductive fluid, comprising: valve means operable to feed fluid into said container; and means for sensing the level of said fluid including, electrode means having at least one electrode normally in contact with the fluid, first switch means for controlling the operation of said valve means, second switch means for controlling the energization of said electrode means, electromagnetic means responsive to a loss of contact between the fluid in said container and said one electrode for closing said first switch means to operate said valve means to feed fluid to said container, and opening said second switch means to de-energize said one electrode; and means for shunting out said electromagnetic means when the level of fluid in the container rises to a predetermined level for thereupon opening said first switch means to render said valve means inoperative and for closing said second switch means.

References Cited by the Examiner

UNITED STATES PATENTS

| | | | |
|---|---|---|---|
| 1,346,898 | 7/20 | Kingsbury | 137—392 |
| 2,357,371 | 9/44 | Wolfner | 317—123.4 |
| 2,539,206 | 10/48 | Robinson | 317—141 |
| 2,588,677 | 3/52 | Welty et al. | 137—391 |
| 2,766,406 | 10/56 | Schwarzkopf | 317—132 |

WILLIAM F. O'DEA, *Primary Examiner.*

M. CARY NELSON, *Examiner.*